US012807426B2

(12) United States Patent
Kainersdorfer et al.

(10) Patent No.: US 12,807,426 B2
(45) Date of Patent: Nov. 24, 2026

(54) METHOD AND DEVICE FOR MOVING GOODS WITH A LOAD CARRIER

(71) Applicant: KNAPP SYSTEMINTEGRATION GMBH, Leoben (AT)

(72) Inventors: Günther Kainersdorfer, Graz (AT); Stephan Maurer, Graz (AT); Franz-Alois Riedner, Weisskirchen (AT)

(73) Assignee: KNAPP SYSTEMINTEGRATION GMBH, Leoben (AT)

( * ) Notice: Subject to any disclaimer, the term of this patent is extended or adjusted under 35 U.S.C. 154(b) by 206 days.

(21) Appl. No.: 18/839,639

(22) PCT Filed: Mar. 9, 2023

(86) PCT No.: PCT/EP2023/055981
§ 371 (c)(1),
(2) Date: Aug. 19, 2024

(87) PCT Pub. No.: WO2023/180078
PCT Pub. Date: Sep. 28, 2023

(65) Prior Publication Data

US 2025/0153955 A1 May 15, 2025

(30) Foreign Application Priority Data

Mar. 24, 2022 (EP) .................................... 22164145

(51) Int. Cl.
*B65G 47/82* (2006.01)
*B65G 1/137* (2006.01)
(Continued)

(52) U.S. Cl.
CPC ........... *B65G 47/82* (2013.01); *B65G 1/1376* (2013.01); *B65G 43/08* (2013.01); *B65G 47/52* (2013.01);
(Continued)

(58) Field of Classification Search
CPC ...... B65G 47/82; B65G 1/1376; B65G 43/08; B65G 47/52; B65G 2201/0258;
(Continued)

(56) References Cited

U.S. PATENT DOCUMENTS 6,688,839 B1 * 2/2004 Hirschek ................ B65B 35/50
198/347.1
7,735,625 B2 * 6/2010 Schafer ................ B65G 1/1378
198/782

(Continued)

FOREIGN PATENT DOCUMENTS

DE 2 107 490 9/1972
DE 10 2007 038 834 2/2009

(Continued)

OTHER PUBLICATIONS

Int'l Search Report (SR) (Form PCT/ISA/210) conducted in Int'l Appln. No. PCT/EP2023/055981 (Jun. 21, 2023).

(Continued)

*Primary Examiner* — Gregory W Adams
(74) *Attorney, Agent, or Firm* — GREENBLUM & BERNSTEIN, P.L.C.

(57) ABSTRACT

Method and device for moving goods, e.g., in an automated storage facility, where goods are moved onto a load carrier or tray, which are then moved over a conveyor section, and thereafter moved from/pushed off the load carrier by a pusher. The load carrier is moved to a first removal position, at which a first good is pushed off, after which the load carrier is moved either together with a second good back into the storage facility and the second good is moved from the load carrier at a later point in time, or to a second removal position at which the second good is moved from the load carrier. Device for the targeted movement of goods including a conveyor section on which load carriers are moved. At least one unit, e.g., a pusher, moves/pushes off goods from
(Continued)

the load carrier transversely to the conveying direction of the conveyor section.

22 Claims, 6 Drawing Sheets

(51) Int. Cl.
*B65G 43/08* (2006.01)
*B65G 47/52* (2006.01)

(52) U.S. Cl.
CPC ................ *B65G 2201/0258* (2013.01); *B65G 2203/0233* (2013.01); *B65G 2203/041* (2013.01); *B65G 2207/46* (2013.01)

(58) Field of Classification Search
CPC ...... B65G 2203/0233; B65G 2203/041; B65G 2207/46
See application file for complete search history.

(56) References Cited

U.S. PATENT DOCUMENTS

| | | | | |
|---|---|---|---|---|
| 9,387,992 | B2 * | 7/2016 | Boschi | B65G 47/904 |
| 9,457,966 | B2 * | 10/2016 | Issing | B65G 1/06 |
| 9,573,773 | B2 * | 2/2017 | Otto | B65G 17/38 |
| 10,793,376 | B2 * | 10/2020 | Ukisu | B65G 47/52 |
| 10,875,719 | B1 * | 12/2020 | Kalm | B65G 1/1376 |
| 2011/0088996 | A1 | 4/2011 | Hoene | |
| 2013/0306434 | A1 | 11/2013 | Issing | |
| 2016/0052716 | A1 | 2/2016 | Schnabl et al. | |
| 2016/0130085 | A1 | 5/2016 | Yamashita | |
| 2016/0229634 | A1 | 8/2016 | Yamashita | |
| 2016/0244262 | A1 | 8/2016 | O'Brien et al. | |
| 2017/0275105 | A1 | 9/2017 | Porat et al. | |
| 2017/0305674 | A1 | 10/2017 | Debruijn | |
| 2019/0144211 | A1 * | 5/2019 | Winzinger | B65G 43/00 700/218 |
| 2019/0225433 | A1 | 7/2019 | Ooba | |
| 2020/0269432 | A1 * | 8/2020 | Beinhofer | B25J 19/023 |

FOREIGN PATENT DOCUMENTS

| | | |
|---|---|---|
| EP | 2 826 729 | 1/2015 |
| EP | 2 862 818 | 4/2015 |
| GB | 1329677 | 9/1973 |
| WO | 90/09943 | 9/1990 |
| WO | 2012/085271 | 6/2012 |
| WO | 2018/153717 | 8/2018 |
| WO | 2019/140473 | 7/2019 |

OTHER PUBLICATIONS

Int'l Written Opinion (WO) (Form PCT/ISA/237) conducted in Int'l Appln. No. PCT/EP2023/055981 (Jun. 21, 2023).
Int'l Prelim. Exam. Report (IPER) (Form PCT/ISA/409) conducted in Int'l Appln. No. PCT/EP2023/055981 (Jun. 5, 2024).

* cited by examiner

METHOD AND DEVICE FOR MOVING GOODS WITH A LOAD CARRIER

The invention relates to a method for moving goods, in particular in an automated storage facility, wherein goods, in particular from a storage facility, are moved onto a load carrier, in particular onto a tray, after which the goods are moved with the load carrier over a conveyor section, after which the goods are moved from the load carrier, in particular arc pushed off the load carrier by a pusher.

The invention further relates to a device for the targeted movement of goods, in particular an automated storage facility, comprising a conveyor section on which load carriers with goods can be moved, wherein at least one unit, in particular a pusher, is provided with which goods can be moved from, in particular can be pushed off, the load carrier, in particular transversely to the conveying direction of the conveyor section.

Methods and devices of the type named at the outset are known from the prior art, for example for removing goods from a storage facility in a targeted manner as part of a picking and packing process, to move said goods over a conveyor section to an orientation section using a load carrier, on which orientation section the goods are then oriented according to a packing layout on a target load carrier, so that said goods can be easily arranged on the target load carrier according to a packing layout. In particular, methods and devices of this type have become known from the document WO 2018/153717 A2.

In methods of this type, an efficiency is always a clear main objective.

Therefore, the invention aims to specify a method of the type named at the outset which is particularly efficient.

In addition, a device is to be specified with which a particularly efficient method can be realized.

The first object is attained according to the invention by a method of the type named at the outset in which the load carrier is moved to a first loading position, at which a first good is moved from, in particular pushed off, the load carrier, after which either the load carrier is moved together with a second good back into the storage facility and the second good is moved from the load carrier at a later point in time, or the load carrier is moved to a second removal position at which the second good is moved from the load carrier.

In the course of the invention, it was found that, in methods from the prior art, only a low efficiency is achieved particularly because all goods located on a load carrier are removed from the load carrier simultaneously, typically using a pusher, though in accordance with the prior art there is, as a rule, only a single good located on a load carrier. In order to be able to arrange the individual goods on the target load carrier according to a precalculated packing layout, a sequence of goods on the orientation section corresponding to the packing layout is normally desirable. Thus, in order to be able to obtain said sequence using methods from the prior art, the goods are removed from the storage facility and conveyed to the orientation section according to a sequence using separate load carriers or trays, which sequence is needed on the orientation section for the packing layout. Accordingly, goods needed in consecutive sequence are conveyed out of the storage facility to the orientation section using at least two separate trays in order to be able to guarantee the sequence on the orientation section.

Though reference is constantly made to a first and second good in this case for the sake of simpler illustration, it shall be understood that the method can be carried out with any desired number of goods on the load carrier, for example with four goods on the load carrier. Accordingly, alternatively to a return to the storage facility, it is also possible not only for a second removal position to be provided; rather, any desired number of further removal positions, for example three, can also be provided in addition to the first removal position.

Of course, the method according to the invention can also be realized with a combination of a goods removal at a second removal position and, if necessary, further removal positions and a return of goods to the storage facility. For example, the method can also be realized in that a load carrier with four goods, which were positioned on the load carrier beforehand, is first removed from an OSR storage facility, after which the load carrier is moved to a first removal position at which a first good is moved from the load carrier. The other three goods can then be moved from the load carrier collectively or separately at one, two, or three other separate removal positions, partially moved from the load carrier at one or two other removal positions and partially returned to the storage facility, or entirely returned to the storage facility on the load carrier.

In the course of the invention, it was then found that, through a simultaneous movement of multiple goods from the storage facility to a first removal position using a single load carrier, an efficiency can be increased, in particular because fewer load carriers are required, wherein at the same time a desired sequence on the orientation section can be achieved in that the individual goods are moved off the load carrier not simultaneously as known in the prior art, but rather sequentially, in particular using a pusher. As a result, the sequence needed on the orientation section is obtained by the order of the pushing of goods off the load carrier. To form the sequence, it is thus no longer absolutely necessary to use different load carriers that are moved on the conveyor section according to the sequence.

Typically, the method is used in combination with what is referred to as an OSR storage facility, wherein all goods are stored in load carriers, for example in shelves. Normally, the goods on a load carrier are thereby all of a single type. In methods from the prior art, only a single good is stored per load carrier in most cases, so that individual goods can be removed from the storage facility by removing a single load carrier. If multiple goods are stored in a load carrier, said goods are removed simultaneously according to the prior art, and different goods, which are then removed from different load carriers, are subsequently sorted in order to place the goods in an order corresponding to a packing layout, for example. As a result, the goods must often be cached on a unit located downstream from the conveyor section, such as a sequencing unit, for example, whereby a throughput decreases. Here, the method according to the invention leads to a significant improvement, especially since in one load carrier multiple goods can be stored which nevertheless do not need to be removed simultaneously. Thus, only one good is selectively removed from the load carrier, for example, after which the one or more other goods located on the load carrier are removed at a second removal position at a later point in time, in order to be fed to a second picking and packing station, for example, or returned to the storage facility. As a result, an available storage space is better utilized and, at the same time, downstream units such as a sequencing unit in particular are not needed for a caching of goods, so that a high throughput continues to be achieved.

A pushing-off, movement, or removal of the individual goods from the load carrier can thereby occur with a single pusher. Alternatively, it is of course also possible to provide multiple pushers.

Alternatively to one or more pushers, one or more other units for moving the goods from the load carrier can also be provided, for example one or more grippers or the like.

The unit for moving the goods from the load carrier can also be configured to change an orientation of the goods during a movement of the goods from the load carrier. For example, a gripper embodied to be translational and rotational can constitute a unit of this type, with which gripper the goods can be lifted from the load carrier onto the target load carrier or an upstream conveyor unit.

The pusher typically comprises a plate or the like with which a force can be applied to a good, and can be horizontally and vertically movable relative to the conveyor section. Typically, the pusher can be freely moved in a plane perpendicular to a conveying direction of the conveyor section. This can be realized, for example, by two coupled linear drives. The pusher can also be movable at different speeds, in order to be able to gently guide the pusher to a good and then push the good off at high speed.

The pusher can also be freely movable in a plane that is at an angle to the conveying direction, for example at an angle of 10 degrees to 80 degrees, in particular 30 degrees to 60 degrees. This can be beneficial particularly if goods are to be pushed off moving load carriers. It can also be provided that a position of the plane in which the pusher is freely movable can be changed relative to the conveying direction in order to enable a pushing-off of goods and freely definable angles. A speed of the pushed-off goods parallel to the conveying direction can thus also be influenced using the pusher.

Finally, an embodiment of the pusher is also possible in which the pusher can be freely moved translationally and, if necessary, also rotationally in all spatial directions.

If, for example, only a single pusher is provided, a first removal position can correspond to a position of the load carrier on the conveyor section, at which position only the first good can be pushed off using the pusher, but the pusher does not yet touch the second good, so that a carefully targeted, isolated pushing-off of the first good is easily possible.

Accordingly, it can be advantageous if the goods are arranged in an order on the load carrier, in which order the goods are later needed on the orientation section. Goods needed sooner or first according to a sequence are thus typically arranged in a front region on the load carrier in the storage facility, and goods needed later in the sequence are arranged farther to the rear on the load carrier, so that a direction of movement of the load carrier on the conveyor section does not need to be changed from the first removal position to the second removal position, though this would in principle also be possible. In other words, an order in which the goods are arranged on the load carrier, and according to which order the goods are fed to the pusher, can thus correspond to a desired sequence on the orientation section, or to the sequence necessary for the packing layout, in order to obtain a particularly efficient picking and packing.

Typically, in the storage facility only goods of a single type, for example only beverage bottles from one producer, are moved onto the load carrier, in order to obtain a most easily manageable process with high efficiency. Of course, the method can also be used to handle different goods using one load carrier, for example in that beverage bottles and milk cartons are transported at the same time using the load carrier. Furthermore, it shall be understood that it is not only possible to use the method for foods, or goods for supermarkets, but rather for any kind of goods.

The method is, of course, also possible with more than two removal positions that can be defined by one or more units for removing goods from the load carrier, in particular by positions of one or more pushers.

The conveyor section is typically embodied in a manner known from the prior art for the transport of load carriers, in particular of trays, and can, for example, comprise one or more belts, link belts, and/or driven rollers, with which the load carriers are set in desired movements and decelerated.

It can also be provided that the first good and the second good are simultaneously moved from the load carrier at the first removal position, after which the goods are separated and the second good is moved back onto the load carrier again, after which the second good is moved back into the storage facility together with the load carrier or is moved from the load carrier at the second removal position.

It shall be understood that, not only can two removal positions be provided, but rather any desired number of removal positions can in principle be provided.

This can be particularly advantageous if the goods are arranged on the load carrier such that they cannot be removed individually, but rather only collectively by a unit for moving the first good from the load carrier. This can be the case, for example, if two goods are positioned one after another on the load carrier along a direction of movement of a pusher. In this case, it can be that the goods are only able to be pushed off the load carrier collectively by the pusher. The splitting-up of the goods then occurs on a downstream unit, such as a separator unit or an orientation section for example, from which one or more unneeded goods are moved back onto the load carrier again. For this purpose, a further unit, such as a pusher for example, can be provided which moves the unneeded goods back onto the load carrier.

It is beneficial if multiple load carriers having goods are moved sequentially over the conveyor section and individual goods are removed from the individual load carriers according to a sequence, according to which sequence the goods are subsequently arranged on a target load carrier, in particular a pallet, in particular in a stack according to a predefined packing layout. The method according to the invention is thus suitable for picking and packing, especially for the particularly efficient formation of stacks in OSR storage facilities, among other things.

It is preferably provided that the goods are stored on the load carriers in the storage facility and, together with the load carriers, removed from the storage facility and moved onto the conveyor section. A storage facility of this type is also referred to as an OSR storage facility, that is, as an order storage and retrieval storage facility, in which goods of a different size are stored in load carriers or containers of a uniform size and are removed in an automated manner and, where necessary, placed back into storage. Due to the possibility of storing multiple goods in one load carrier and removing only individual goods from the load carrier, a storage facility utilization that is improved over the prior art can be achieved.

In order to be able to push off the individual goods with pinpoint accuracy and in an individual manner, it is advantageous if positions and orientations of the goods on the load carrier are captured, in particular using a lidar sensor, a measuring unit, or a camera, before the load carrier reaches the first removal position, after which a unit, in particular a pusher, is activated based on the captured positions of the goods in order to move, in particular to push off, the first good from the load carrier in a targeted manner.

Individual goods can then also be pushed off reliably and in an isolated manner from one or more other goods using a pusher if the pusher is lowered or raised during a movement along a push-off direction in order to be lifted past goods on the load carrier or to dip between goods on the load carrier and to push off individual goods in a targeted manner. Individual goods can thus also be pushed off in a targeted manner if multiple goods are arranged one after another in a push-off direction, in particular if there is a gap between the goods. The push-off direction typically runs horizontally and at an angle of 1 degree to 179 degrees to the conveying direction, preferably at an angle of 30 degrees to 90 degrees to the conveying direction.

It is beneficial if the pusher can be lowered and raised independently of a current position along the conveying direction, so that said pusher can dip between goods on the load carrier. This can be achieved with a multiaxial drive, for example.

In addition to positions and orientations of the goods on the load carrier itself, a position of the load carrier relative to the pusher is preferably also continuously captured, for example via a rotary encoder that is connected to conveyor rollers of the conveyor section, which conveyor rollers convey the load carrier from a region below the lidar sensor or a camera to a pusher. Thus, using the rotary encoder, a position of the goods located on the load carrier relative to the pusher is known in an exact manner so that, with a corresponding control of the pusher, one of a plurality of goods can be pushed off the load carrier in an isolated manner with pinpoint accuracy by means of the pusher, whereas other goods remain on the load carrier. A corresponding position at which a first good can be moved from the load carrier by means of the pusher, but a second good is not touched by a movement of the pusher, can be considered the first removal position of the load carrier on the conveyor section.

It is furthermore beneficial if dimensions of the goods on the load carrier are captured, in particular using a lidar sensor or using a camera, before the load carrier reaches the first removal position, after which the pusher is activated based on the captured dimensions of the goods in order to push off the first good in a targeted manner.

Dimensions that the goods should have are typically known on the basis of master article data stored in a higher-level data processing system. With a corresponding capture of these dimensions immediately before the removal position, altered dimensions can be reliably detected so that error sources are minimized. It is thereby also possible to capture in an automated manner whether dimensions of goods lie outside of known tolerances.

It is particularly beneficial if the positions and/or dimensions of the goods on the load carrier are captured when the load carrier is located near the first removal position, in particular when the load carrier is still being moved only translationally to the removal position, preferably when the load carrier is less than 10 m, in particular less than 3 m, away from the first removal position, particularly preferably after a base of the load carrier has been raised.

In this manner, it is ensured with particular reliability that the positions, orientations, and/or dimensions of the goods that are captured using the lidar sensor, a camera, or a corresponding unit, correspond to the positions, orientations, and/or dimensions of the goods when the load carrier is located at the removal position and the desired good can be pushed off by the pusher. Movements of the goods relative to the load carrier between the capture of position, orientation, and/or dimensions and the removal position are then virtually eliminated.

Particularly if positions, orientations, and dimensions of the goods are first captured after a base of the load carrier or tray has been raised above a rim of the load carrier so that goods can be easily pushed off the base, a risk that a position of the goods relative to the load carrier will still change is extremely low. Using corresponding control logic with servo or drives having frequency converters, a gentle and nevertheless effective transport is ensured in a particularly simple manner without position shifts of the goods.

As a result, it is thus possible to achieve a particularly accurate pushing-off of the individual goods, if necessary even during a simultaneous movement of the load carrier.

For a simple comparison of whether the correct goods were actually removed from the storage facility, it can also be provided in addition to the capture of dimensions of the goods that a barcode of the goods on the load carrier is read before the goods reach the first removal position.

It is beneficial if the first good is pushed off the load carrier in a targeted manner by a pusher while the second good remains on the load carrier. The pusher can thus reach, in particular dip, in a targeted manner into a gap, which was captured using a sensor such as a lidar sensor for example, in order to push off the first good, but not the second good. The second good can then be removed from the load carrier at a second removal position or can be moved into the storage facility, preferably embodied as an OSR storage facility, together with the load carrier.

A particularly rapid movement of the goods from the storage facility to the removal position with a simultaneously simple removal of the goods is possible if a load carrier having a peripheral side wall and a base that can be raised above the side wall is used, wherein the base is raised in the region of the removal position, in particular by means of a ramp, after which the goods are moved from, in particular pushed off, the load carrier. The corresponding load carrier is thus embodied similarly to a container that is open at the top and has a peripheral sidewall, though a base of the container can be raised relative to the side wall in a vertical direction. This raising preferably takes place by means of a positive fit using a ramp, so that the base is automatically raised in a movement, for example in a region of the removal position, in order to be able to easily push goods off. Accordingly, the base is typically lowered again by a ramp after leaving the removal position, in order to securely transport goods in the load carrier that were not removed and to be able to prevent an unintended sliding out of said goods using the side wall.

If, for example, a robot having a gripper is used in place of a pusher for removing the goods from the load carrier, a raising of the base is not absolutely necessary, even though it can also occur in this case.

Alternatively to a ramp with which the base is raised during a movement along the conveyor section, a unit for raising the base independently of a movement along the conveyor section can of course also be provided. For example, a linear drive or a pneumatic cylinder with which the base can be raised at a certain position while the tray is stationary. A linear drive of this type can be arranged below the base or, for example, can engage in a bracket protruding laterally out of the tray, which bracket is connected to the base, in order to raise the base.

In order to ensure a reliable pushing-off of the goods in the region of the removal position, it can be provided that a speed of the load carrier on the conveyor section is reduced before the first good is pushed off by the pusher.

It can also be provided that the load carrier is stopped on the conveyor section, after which the first good is pushed off using the pusher, after which the load carrier is moved with the second good to the second removal position. The load carrier can also be stopped again at the second removal position, after which the good is pushed off using the pusher with which the first good was already pushed off, or is removed using a different unit such as another pusher, for example.

In order to obtain a particularly efficient method, it can also be provided that the first good is pushed off the load carrier while the load carrier is being moved on the conveyor section. It shall be understood that, in a pushing-off of goods with a load carrier that is simultaneously moving, pusher movements that are correspondingly quicker are advantageous. At the same time, it is precisely here that a particularly accurate positioning and orientation detection of the goods on the load carrier is beneficial.

Particularly if the goods are pushed off the load carrier during a movement of the load carrier, it can be beneficial if the pusher is moved not perpendicularly to the conveying direction of the conveyor section, but rather at an angle of 10 degrees to 80 degrees, in particular 30 degrees to 60 degrees, to the conveying direction. Thus, by a vectorial addition of a push-off movement and a speed of the good along the conveying direction, a defined target of the good or push-off movement can be achieved in a precise manner.

It is therefore beneficial if the first good is moved from the load carrier using a unit, in particular pushed off using a pusher, which has a speed component along a conveying direction, in particular at an angle of 10 degrees to 80 degrees, preferably approximately 30 degrees, to the direction of movement of the load carrier. In contrast to a movement at an angle of 90 degrees to the conveying direction, which does not have a speed component along or parallel to the conveying direction, even goods that are moving along the conveying direction can therefore be pushed off with high precision.

Thus, it can in principle also be provided that the pusher is embodied to push off goods at different angles to the conveyor section, in order to obtain a sequence of the goods on a downstream conveyor unit using an angle of a push-off movement.

Furthermore, the pusher could also be designed to travel and have a return stroke.

Particularly if goods are adjacent to one another on the load carrier such that a pushing-off of a single good is not possible independently of a movement of the other good, it can be advantageous if the first good and the second good are collectively moved from, in particular pushed off, the load carrier at the first removal position, after which the first good is separated from the second good and the second good is moved onto the load carrier again or onto another load carrier, after which the load carrier is moved with the second good to the second removal position. For this purpose, a section having units for separating goods and handling individual goods, in particular with a robot or individually controllable rollers, can, for example, be provided adjacently to the first removal position. Here, units can also be provided with which goods are moved back onto the load carrier again, for example one or more additional pushers. The load carrier onto which the good is moved back can be the same load carrier from which the good was removed, but these can also be different load carriers.

It is particularly beneficial if one or more goods at the first removal position are moved, in particular pushed off, onto a separator region on which the goods, being moved in a targeted rotational and translational manner, can be at least partially moved back onto the load carrier or a different load carrier. As a result, multiple goods on one load carrier can then also be handled in an isolated manner and fed, if necessary according to a predefined sequence, to an orientation section or another downstream unit if the goods are not arranged one after another on the load carrier. This can be the case, for example, if the goods slip on the load carrier during transport from the storage facility to the removal position with the load carrier.

It can also be provided that goods that are adjacent to one another on the load carrier are selectively pushed off, in that said goods are slowly pushed by the pusher onto a unit for moving goods away from the removal position, preferably rubberized acceleration rollers, which are arranged on an area next to the load carrier. These acceleration rollers move faster than the pusher and, for example, pull the frontmost good away onto the roller conveyor. The rear good, in this case still located half in the load carrier, which could physically be lying roughly on the rim of the tray for example, can be pushed back into the load carrier again using guides, railings, or another unit, so that said good remains in the load carrier and can continue to be moved with the load carrier. It is therefore beneficial if the device is embodied such that goods can be pushed off onto a region equipped with accelerator rollers using the pusher, with which accelerator rollers goods can already be moved away from the load carrier while the goods are still touching the load carrier, in order to be able to separate individual adjacent goods from one another during an unloading, for example.

It is preferably provided that, adjacent to the first removal position, a unit for moving goods away from the removal position, preferably accelerator rollers, is provided, in particular rubberized accelerator rollers with which the first good is pulled away from the load carrier after the good has been at least partially pushed off the load carrier.

It is particularly beneficial if a pusher is used which can be moved at different, preferably freely selectable, speeds. The pusher can then be gently guided to the goods in order to then powerfully accelerate said goods. It is thus prevented that an impact is exerted on the goods in a rapid movement by means of the pusher, which impact could lead to an uncontrollable movement.

According to the invention, the other object is attained with a device of the type named at the outset which is configured to move, in particular to push off, a first good from the load carrier at a first removal position, to then either move the load carrier together with a second good back into the storage facility or to move the load carrier to a second removal position and, at the second removal position, to move, in particular to push off, the second good from the load carrier, wherein the device is in particular configured to carry out a method according to the invention.

Because multiple goods needed in sequence can also be conveyed simultaneously out of the storage facility over the conveyor section using a single load carrier with a device of this type, an increased efficiency in the method is thus obtained. At the same time, due to the possibility of removing only individual goods, with unneeded goods either being moved back into the storage facility or moved from the load carrier at a second removal position, a high throughput is achieved.

It is beneficial if a unit for capturing a position and/or orientation of the goods on the load carrier is provided in the region of the pusher, wherein the device is configured to actuate the pusher and to move the load carrier on the conveyor section depending on the captured position and/or orientation of the goods on the load carrier. The individual goods on the load carrier can thus be pushed off sequentially and simultaneously, with high precision. The unit can thereby be positioned stationarily along the conveyor section or can be moved relative to the conveyor section, in order to synchronously travel with a load carrier entering the removal, for example.

Preferably, an orientation section is provided, onto which goods can be pushed off from the load carrier using the pusher. With the orientation section, orientations of the goods can be changed in that the goods are rotated, separated, tilted, aligned to a preferred side, and/or grouped. Of course, the orientation section does not need to be arranged directly adjacent to a removal region, in which removal region the goods can be pushed off from the load carrier using the pusher; rather, an additional conveyor unit, such as a separator region for example, can also be provided between the load carrier and the orientation section.

It is preferably provided that the device is embodied such that, using the pusher, goods can be pushed off onto a region equipped with a unit for moving goods away from the removal position, preferably onto a region equipped with acceleration rollers, with which unit goods can already be moved away from the load carrier while the goods are still touching the load carrier, in order to be able to separate individual adjacent goods from one another during an unloading, for example. In this manner, an individual good can, for example, be removed in an isolated manner even if said good is lying directly in front of another good without a gap.

In order to be able to push off individual goods in a targeted manner, it is beneficial if the pusher is embodied to be lowered and raised during a movement in a push-off direction, namely independently of a current position along the push-off direction, in order to be able to dip between goods on the load carrier and be lifted past goods. The pusher can thus, for example, be freely movable in a plane that is positioned at an angle of 30 degrees to 90 degrees to the conveying direction, though the pusher can in principle of course also be embodied to be freely movable in all spatial directions, so that an angle at which the push-off direction is positioned to the conveying direction can be altered.

Additional features, advantages, and effects of the invention follow from the exemplary embodiment illustrated below. In the drawings which are thereby referenced:

Figure 5A:
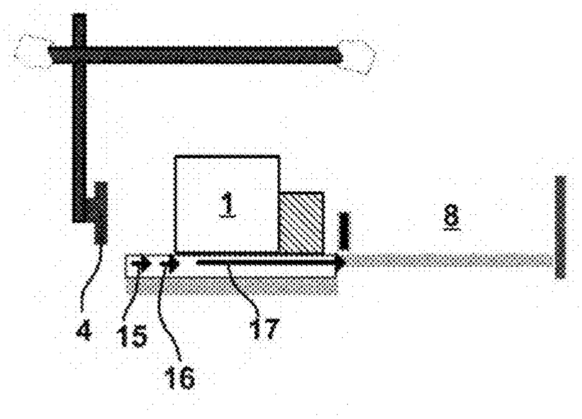
Figure 5B:
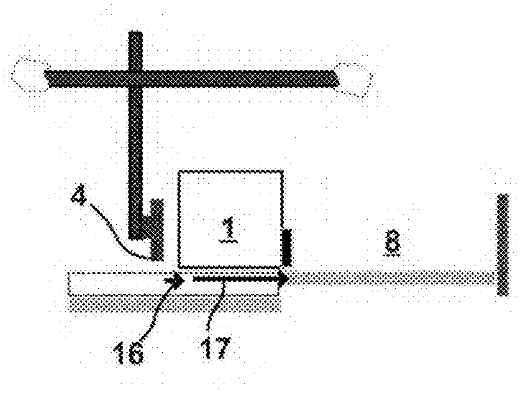
Figure 6A:
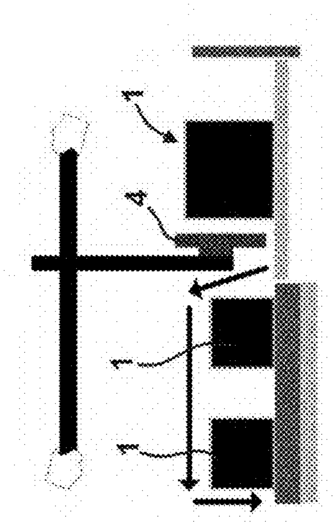
Figure 6B:
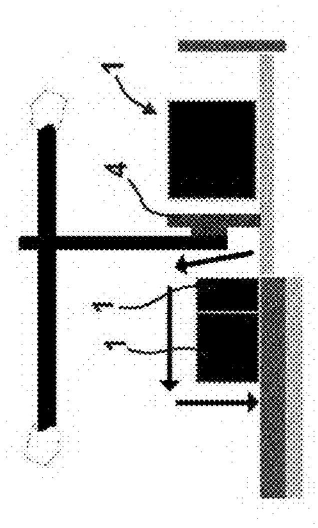
Figure 6C:
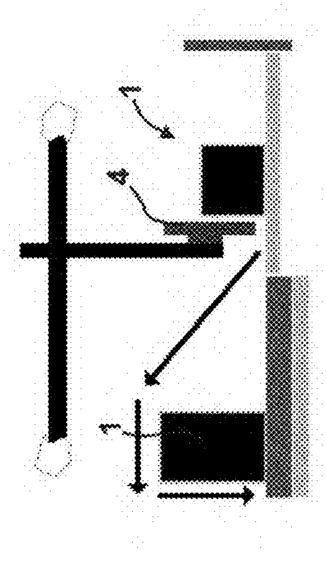
Figure 6D:
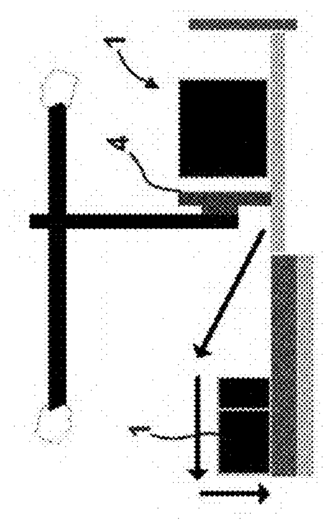

FIGS. 5*a* and 5*b* show different method states during a pushing of a good off a load carrier;

FIGS. 6*a* through 6*d* show different method states during a return movement of a pusher.

Figure 1:
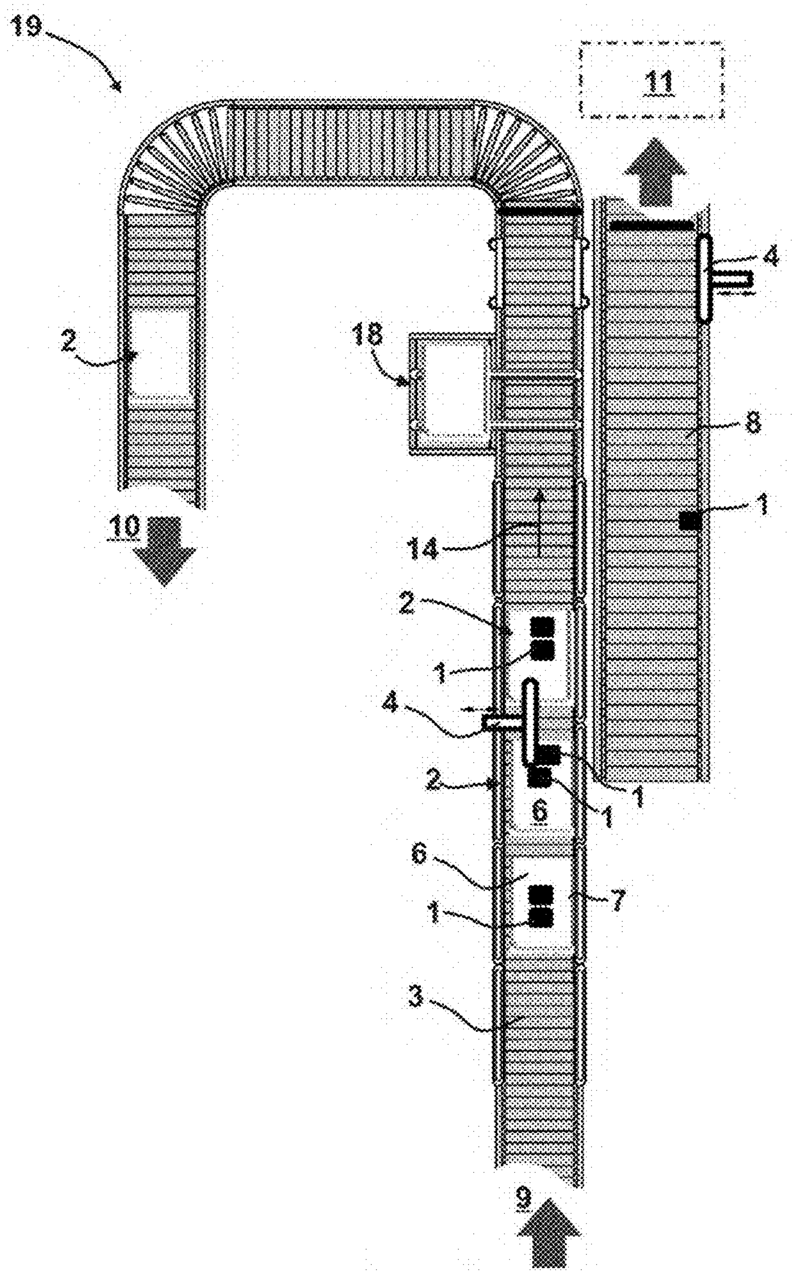
FIG. 1 shows a plan view of a device according to the invention.

FIG. 1 shows a plan view of a device 19 according to the invention. Visible is a conveyor section 3 on which goods 1 arranged on load carriers are conveyed, which goods 1 have, for example, been removed from a storage facility and have been moved onto the load carriers in the storage facility. The storage facility can also be embodied as an OSR storage facility in which the goods 1 are stored on load carriers. The storage facility is not illustrated here; rather, a feed 9 of the load carriers to the conveyor section 3 is shown schematically, via which feed 9 the load carriers are fed to the conveyor section 3. After leaving the depicted removal region, in which the goods 1 are at least partially removed from the load carriers, the load carriers are guided back into the storage facility again in the illustrated embodiment. This is schematically indicated by a return 10.

The load carriers, embodied as trays 2, comprise a peripheral rim and a base 6 that can be moved vertically relative to the peripheral rim, which base 6 is raised by means of a lifting ramp 20 located upstream from a removal region, so that the goods 1 can be pushed off the base 6 horizontally and perpendicularly or at an angle of, for example, 30 degrees to 60 degrees to a conveying direction 14 of the conveyor section 3. Schematically illustrated is a pusher 4 that can be moved perpendicularly or at a corresponding angle to the conveying direction 14 of the conveyor section 3, as well as a measuring and position detection unit located upstream from said pusher 4, with which unit dimensions, positions, and orientations of the goods 1 on the load carriers can be captured.

In order to then be able to push individual goods 1 off a load carrier in a targeted manner, the load carrier is moved to a first removal position, at which a movement of the pusher 4 perpendicularly or at an angle to the conveying direction 14 effects a pushing of a first good 1 off the load carrier, whereas a second good 1 on the load carrier is not touched by the pusher 4, as is illustrated in FIG. 1.

If there is a corresponding gap and space between goods 1, the pusher 4 could also dip therebetween and push the good 1 off. The space can also be achieved by a corresponding auxiliary means in the load carrier or tray such as an insert in the tray, or by a special construction of the tray such as nubs, for example, special anti-slip materials which prevent the shifting and sliding-together of goods and keep said goods in their position separate from one another.

The good 1 is moved by the pusher 4 onto a separator region 8 on which the goods 1 can be individually conveyed, for example using individually drivable rollers, so that the goods 1 can subsequently be conveyed onto an orientation section 11, illustrated schematically.

Of course, the device 19 according to the invention can also be used for the individual removal of single goods 1 from a load carrier if the goods 1 are not subsequently moved onto a separator region 8 and an orientation section 11, but are rather directly handled or picked and packed, for example.

The separator region 8 also comprises a pusher 4 with which the goods 1 can be conveyed back onto the conveyor section 3, or onto a tray 2 on the conveyor section 3. This can be beneficial if two or more goods 1 are positioned on one load carrier such that said goods 1 can only be pushed off simultaneously using the pusher 4. In the separator region 8, the two goods 1 are then separated so that one of these goods 1, which is not needed, can be moved back onto the load carrier again using the second pusher 4 of the separator region 8.

Even though the method is depicted with two goods on one load carrier in the exemplary embodiment, it shall be understood that the method according to the invention can, of course, be implemented with any desired number of goods on one load carrier and any desired number of removal positions. Accordingly, it is of course also possible to move more than one good back onto a load carrier again from the separator region.

After the pusher on the conveyor section 3, a lowering ramp 21 is arranged with which the base 6 is lowered again relative to the peripheral rim so that any goods 1 still located on the load carrier are secured by the peripheral side wall 7, which then once again protrudes past the base 6, and cannot slip off the base 6.

Furthermore, near the removal position or near the pusher 4, a tray reserve space 18 is provided in which load carriers can be held in reserve, for example in order be able to transport goods 1 back into the storage facility via the return 10 using said reserved load carrier in the event of an error or if there has been a prior full unloading. Empty trays 2 are also returned to the storage facility via the return 10.

Figure 2:
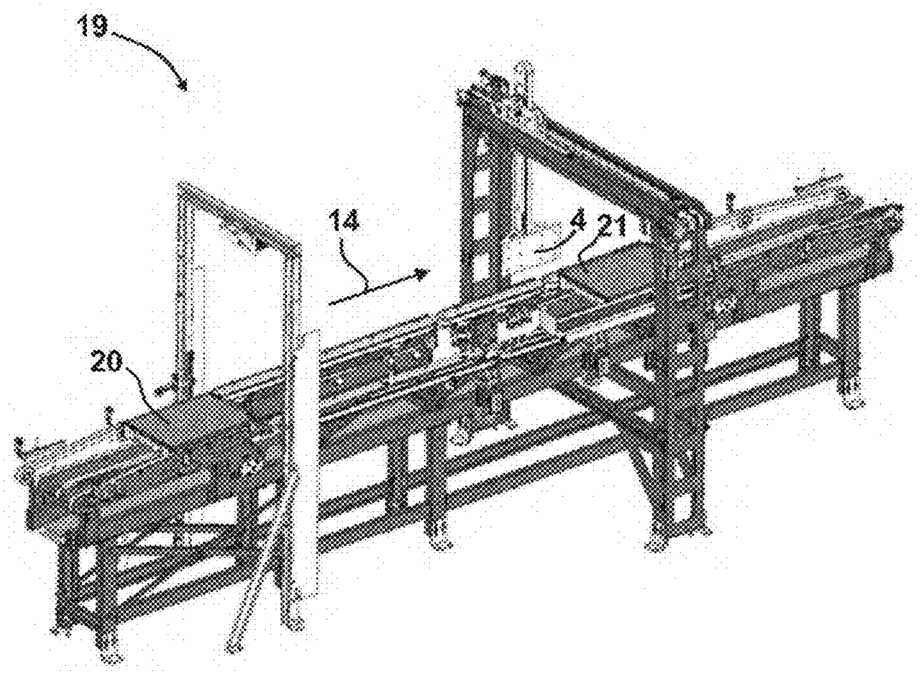
FIG. 2 shows a detailed view of a device according to the invention in a 3D illustration.

FIG. 2 shows a 3D view of the removal region of the device 19 illustrated in FIG. 1. Visible is the pusher 4, comprising a plate, which pusher 4 can be moved horizontally and vertically, perpendicularly or at an angle of, for example, 30 degrees to 60 degrees to a conveying direction 14 of the conveyor section 3. A horizontal movement is thereby necessary in order to be able to horizontally push goods 1 off the load carriers. A vertical movement of the pusher 4 is beneficial in order to be able to move the pusher 4 past goods 1 arranged on the load carrier, for example in a return movement.

Figure 3:
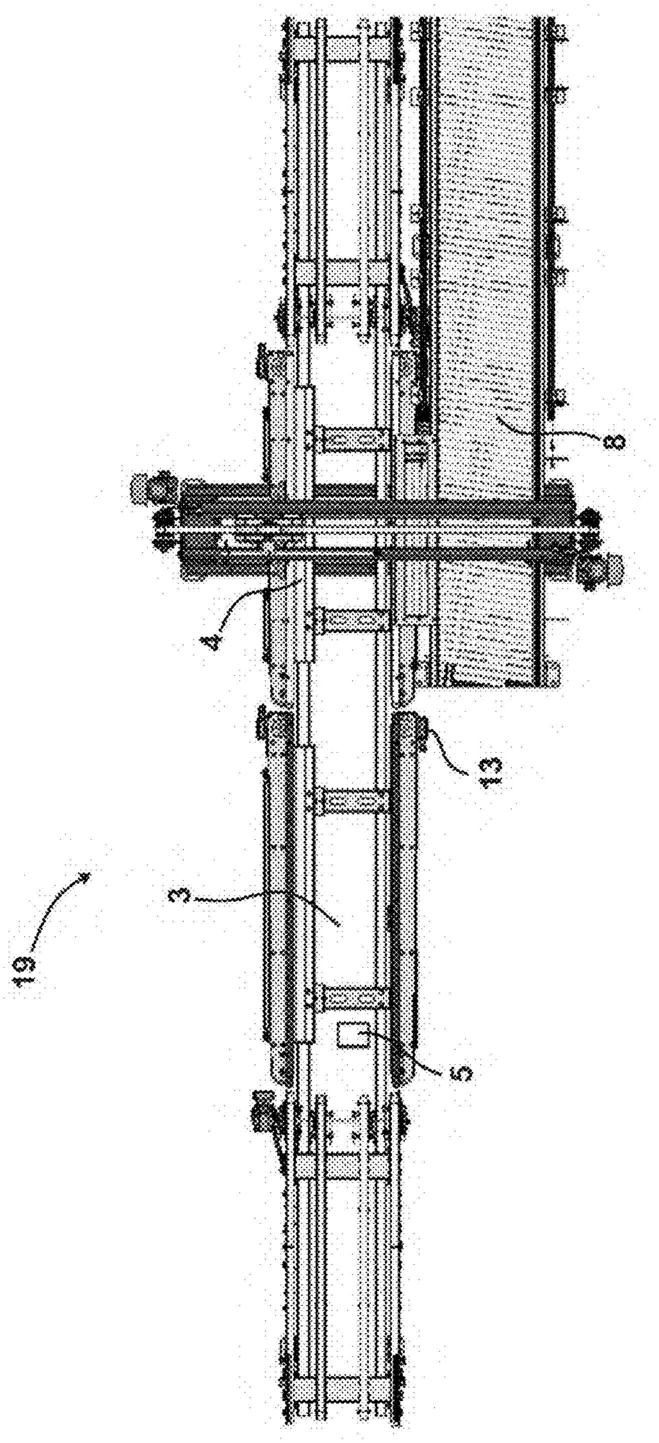
FIG. 3 shows an additional detailed view of a device according to the invention.

FIG. 3 likewise shows, in a plan view, the unloading region of the device 19 illustrated in FIGS. 1 and 2. Here, a lidar sensor 5 is also drawn schematically with which dimensions, orientations, and positions of the goods 1 on the load carriers conveyed on the conveyor section 3 can be captured. Furthermore, a rotary encoder 13 is schematically illustrated with which a distinct correlation between a position of the load carrier, and thus a position of the goods 1 arranged on the load carrier, and a position of the pusher 4 is ensured, which relative position can be used for a particularly precise pushing-off of the individual goods 1.

It can also be seen that, using the pusher 4, a pushing of the goods 1 not only off the load carrier itself onto the adjacent separator region 8, but also a pushing within the separator region 8 itself is even possible. The pusher 4 can thus be moved over an entire width of the separator region 8. As a result, the pushed-off goods 1 can also be horizontally positioned on the separator region 8 using the pusher 4.

In order to be able to determine positions of the load carrier relative to the conveyor section 3 with pinpoint accuracy, photoelectric sensors, not shown, and, if necessary, other sensors can additionally also be provided. Photoelectric sensors can also be used, for example, for a height check, in order to determine heights of the goods on the load carrier.

Figure 4:
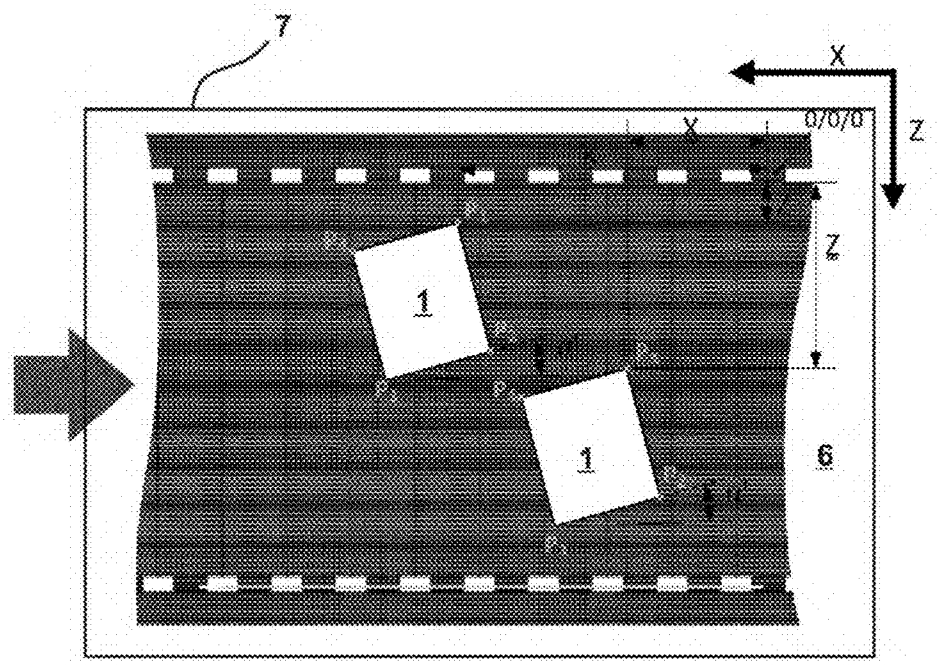
FIG. 4 shows a load carrier with goods, in a plan view.

FIG. 4 shows a plan view of a load carrier with goods 1 that can, for example, be captured using a lidar sensor 5 or a camera. It can be seen that dimensions, orientations, and positions of the goods 1 are captured. Typically, corner points of the goods 1 are determined, based on which corner points a position of the goods 1 relative to the load carrier can be determined in a precise manner.

From the correspondingly determined dimensions, orientations, and positions, a removal position for the load carrier results, which removal position of the load carrier ensures that only one or more defined goods 1, but not all goods 1 located on the load carrier, are pushed off simultaneously using the pusher 4, provided that only individual goods 1 are to be removed.

FIGS. 5*a* and 5*b* show different working states during a pushing-off of a good 1 from the load carrier. As can be seen in FIG. 5*a*, the pusher 4 is initially spaced apart from the good 1. The pusher 4 can typically be moved at different speeds, for example at three different speeds. For a push-off movement, the pusher 4 is preferably first moved rapidly over a first path of travel 15 to the good 1, after which the pusher 4 is decelerated and slowly placed against the good 1 along a second path of travel 16, after which the good 1 is pushed off along a third path of travel 17 at a push-off speed.

In FIG. 5*b*, a situation can be seen in which the pusher 4 has already been positioned near the good 1. It is then possible to immediately begin a slow approach by the pusher 4 to the good 1 along a second path of travel 16, after which the good 1 is pushed off along a third path of travel 17 at a desired push-off speed. In this manner, a controlled and, at the same time, efficient and pinpoint pushing-off of the goods 1 is ensured without an impact being exerted on the goods 1.

The goods 1 can thereby be pushed off both from a load carrier standing still at the removal position and also during a movement of the load carrier.

FIGS. 6*a* through 6*d* show different possibilities for moving back the pusher 4 with which a good 1 has been pushed off and which is located in the region of the orientation section 11, so that one or more goods 1 can be pushed off using the pusher 4. As can be seen, the pusher 4 is for this purpose first raised and then moved against a push-off direction over the goods 1, after which the pusher 4 is lowered.

With a method according to the invention, a particularly efficient movement of goods 1 is thus possible, in particular in an automated storage facility. Due to a precise position determination of the individual goods 1, a pushing of individual goods 1 off a load carrier having multiple goods 1 is thereby also possible during a movement of the load carrier, in order to form a desired sequence on an orientation section 11. If applied in combination with an OSR storage facility, an increased efficiency can be achieved, especially since multiple goods 1 can be stored in one load carrier of the OSR storage facility, whereby a volume of the storage facility can be utilized particularly well, wherein it is at the same time possible to remove only one of said goods 1 so that a separation does not need to take place on downstream units, whereby a high throughput is achieved.

The invention claimed is:

1. A method for moving goods in an automated storage facility, comprising:

moving goods, which include a first good and a second good, from a storage facility onto a load carrier tray;

moving the goods on the load carrier tray over a conveyor section to a first removal position;

pushing the first good off the load carrier tray by a pusher, wherein the pusher is lowered or raised during a movement along a push-off direction in order to be lifted past the second good on the load carrier or to dip between the first good and the second good on the load carrier, thereby pushing off the first good in a targeted manner; and one of:

moving the second good on the load carrier tray back into the storage facility to be moved from the load carrier tray at a later point in time, or moving the second good on the load carrier tray to a second removal position of the conveyor section at which the at least second good is moved from the load carrier tray.

2. The method according to claim 1, wherein the first good and the second good are simultaneously moved from the load carrier tray at the first removal position, after which the goods are separated and the second good is moved back onto the load carrier again, after which the second good is moved together with the load carrier tray back into the storage facility or is moved from the load carrier tray at the second removal position.

3. The method according to claim 1, wherein multiple load carriers having goods are moved sequentially over the conveyor section and individual goods are removed from the individual load carriers according to a sequence, according to which sequence the goods are subsequently arranged on a target load carrier in a stack according to a predefined packing layout.

4. The method according to claim 1, wherein the goods are stored on the load carrier tray in the storage facility and, together with the load carrier tray, removed from the storage facility and moved onto the conveyor section.

5. The method according to claim 1, wherein, adjacent to the first removal position, a unit for moving goods away from the removal position comprising accelerator rollers, is provided, with which the first good is pulled away from the load carrier tray after the first good has been at least partially pushed off the load carrier tray.

6. The method according to claim 1, wherein positions and orientations of the goods on the load carrier tray are captured using a lidar sensor or a camera before the load carrier tray reaches the first removal position, after which the pusher is activated based on the captured positions of the goods in order to push off the first good from the load carrier tray in a targeted manner.

7. The method according to claim 1, wherein dimensions of the goods on the load carrier tray are captured using a lidar sensor or using a camera; before the load carrier tray reaches the first removal position, after which the pusher is activated based on the captured dimensions of the goods in order to push off the first good from the load carrier tray in a targeted manner.

8. The method according to claim 6, wherein the positions and/or dimensions of the goods on the load carrier tray are captured when the load carrier tray, moving only translationally, is located less than 10 m away from the first removal position, but after a base of the load carrier tray has been raised.

9. The method according to claim 6, wherein the first good is pushed off the load carrier tray in a targeted manner by the pusher while the second good remains on the load carrier.

10. The method according to claim 1, wherein a load carrier tray having a peripheral side wall and a base configured to be raised above the peripheral side wall is used, wherein the base is raised in a region of the removal position by a ramp, after which the first good is pushed off the load carrier tray.

11. The method according to claim 1, wherein a speed of the load carrier tray on the conveyor section is reduced before the first good is pushed off the load carrier tray by the pusher.

12. The method according to claim 1, wherein the load carrier tray is stopped on the conveyor section, after which the first good is pushed off the load carrier tray using the pusher, after which the load carrier tray is moved with the second good to the second removal position.

13. The method according to claim 1, wherein the first good is pushed off the load carrier tray while the load carrier tray is being moved on the conveyor section.

14. The method according to claim 1, wherein the first good is pushed off the load carrier tray using the pusher, which has a speed component along a conveying direction at an angle of 10 degrees to 80 degrees to a direction of movement of the load carrier tray.

15. The method according to claim 1, wherein the first good and the second good are collectively pushed off the load carrier tray at the first removal position, after which the first good is separated from the second good and the second good is moved back onto the load carrier tray or onto another load carrier tray, after which the load carrier tray is moved with the second good to the second removal position.

16. The method according to claim 1, wherein the first good comprises one or more first goods and the one or more first goods are pushed off the load carrier tray at the first removal position and onto a separator region on which the one or more first goods can be moved in a targeted rotational and translational manner and from which at least some of the one or more first goods can be at least partially moved back onto the load carrier.

17. The method according to claim 16, wherein the pusher is provided in the separator region to move individual goods back onto the conveyor section or onto a load carrier tray arranged on the conveyor section.

18. The method according to claim 1, wherein the pusher is moved at different speeds during the pushing-off, and wherein the pusher is slowly guided to the first good and subsequently accelerated.

19. A device for the targeted movement of goods, which is configured to carry out the method according to claim 1 in an automated storage facility, comprising:

a conveyor section, having at least a first removal position and at least a second removal position, on which load carrier trays carrying goods are movable;

at least one unit embodied as a pusher configured to push goods off the load carrier trays crosswise to a conveying direction of the conveyor section, the pusher being configured to be lowered or raised during a movement in a push-off direction, independently of a current position along the push-off direction, in order to be able to dip between goods on the load carrier trays to push off individual goods in a targeted manner, and to be lifted past goods on the load carrier trays, wherein the pusher is configured to push off at least a first good of the goods carried by the load carrier trays at a first removal position, wherein, after the at least first good is pushed off the load carrier trays, the load carrier trays carrying at least a second good of the goods are either conveyed into the storage facility or moved to a second removal position and, at the second removal position, the at least second good is moved from the load carrier.

20. The device according to claim 19, further comprising a unit for capturing a position and/or orientation of the goods on the load carrier trays in a region of the pusher, wherein the the pusher is actuatable and the load carrier trays are movable on the conveyor section depending on the captured position and/or orientation of the goods on the load carrier trays.

21. The device according to claim 19, wherein an orientation section is provided onto which goods can be pushed off from the load carrier trays using the pusher.

22. The device according to claim 19, wherein, using the pusher, goods are pushed off onto a region equipped with acceleration rollers for moving goods away from the load carrier trays at the first removal position, while the goods are still touching the load carrier, thereby separating individual adjacent goods from one another during an unloading.

* * * * *